United States Patent [19]

Takaoka et al.

[11] Patent Number: 5,653,321
[45] Date of Patent: Aug. 5, 1997

[54] CLUTCHING DEVICE

[75] Inventors: Fumikazu Takaoka; Hiroyuki Nishiyama; Kiyokazu Tanaka, all of Fuji, Japan

[73] Assignee: Jatco Corporation, Japan

[21] Appl. No.: 507,150

[22] Filed: Jul. 26, 1995

[30] Foreign Application Priority Data

Jul. 28, 1994 [JP] Japan .................................. 6-198038

[51] Int. Cl.$^6$ ...................... F16D 13/68; F16D 25/0638; F16D 55/26
[52] U.S. Cl. .................. 192/70.17; 188/71.5; 192/70.2; 192/85 AA
[58] Field of Search .................. 192/70.17, 70.2, 192/85 AA, 30 V; 188/73.37, 71.5, 73.38

[56] References Cited

U.S. PATENT DOCUMENTS

| | | | |
|---|---|---|---|
| 1,467,732 | 9/1923 | Litle | 192/70.2 X |
| 2,925,897 | 2/1960 | Snyder | 192/70.2 |
| 3,245,508 | 4/1966 | Livezey | 192/70.2 X |
| 3,438,464 | 4/1969 | Barrington | 192/70.2 X |
| 3,472,348 | 10/1969 | Hilpert | 192/70.23 |
| 3,861,501 | 1/1975 | Brooks et al. | 192/70.2 X |
| 4,068,747 | 1/1978 | Snoy | 192/70.2 X |
| 4,081,064 | 3/1978 | Smith et al. | 192/70.2 X |
| 4,396,101 | 8/1983 | Black | 192/70.2 X |
| 4,534,457 | 8/1985 | Eltze et al. | 192/70.2 |
| 5,009,290 | 4/1991 | Harada et al. | 192/70.2 X |
| 5,158,508 | 10/1992 | Sakaguchi et al. | 192/70.2 X |

FOREIGN PATENT DOCUMENTS

| | | |
|---|---|---|
| 56-101223 | 12/1979 | Japan . |
| 59-34026 | 2/1984 | Japan .................................. 192/30 V |
| 59-137621 | 8/1984 | Japan . |
| 2-46324 | 2/1990 | Japan . |
| 2-36631 | 3/1990 | Japan . |
| 4-107324 | 4/1992 | Japan .................................. 192/70.2 |

*Primary Examiner*—Rodney H. Bonck
*Attorney, Agent, or Firm*—Rossi & Associates

[57] ABSTRACT

According to the clutching device of the present invention, a flexible member, which uniformly forces a plurality of friction plates almost in the circumferential direction, is inserted between edge faces, of fixed friction plates, to which no load is applied at the time of engagement, and a spline face that is opposite to the edge faces. The insertion position is selected at such a location where the rotational direction of a rotary body is diagonally upward and toward the center. Since a load on and a degree of distortion of the flexible member are small, the flexible member can be compactly made and can have a simple design, and the mounting structure on the spline side is also simpler.

The clutching device with this structure effectively prevents the vibration of friction plates, requires only a small number of components. And additional components are easily installed and removed.

8 Claims, 5 Drawing Sheets

CLUTCHING DEVICE

BACKGROUND OF THE INVENTION

1. Field of the Invention

The present invention relates to a clutching device that is installed in an automatic transmission, such as a multiple-plate clutch or a multiple-plate brake.

2. Description of the Prior Art

An automatic transmission, where a torque converter is coupled with a speed change mechanism that employs planetary gears, is in practical use, and frees operators of automobiles from the complex clutch operations that accompany speed changes. The speed change mechanism includes a plurality of planetary gears, clutchs, and brakes, and acquires a speed change output at a required speed change ratio from the set of planetary gears by varying the engaging combinations for the clutchs and the brakes. The general clutch and brake have a multiple plate structure, arranged wherein are "two support members that rotate relatively to each other while their splines are opposite each other in the direction of the diameter" and "a hydraulic piston mechanism." In the multiple plate structure, friction plates that engage one of the two splines and friction plates that engage the other spline are alternately positioned so as to share a ring-shaped overlapped area, and the piston mechanism, shifting in a direction of a relative rotational axis, imposes pressure on the overlapping plates, and permits that pressure to act on the overlapping portion of the friction plates."

For a clutch and a brake with the above multiple-plate structure, when one of the two members is rotated and the other is stationary while the friction plates are disengaged, the friction plates that are halted will wobble, and make noise, and cause vibrations. This occurs because the friction plate that is halted repeats the movements where, within the range of the wobbling relative to the engaged spline, the friction plates rise due to the rotation of the opposite friction plates and fall due to gravity. A structure that prevents such wobbling and vibration of the friction plates is disclosed in Japanese Patent Application Laid-open No. 2-46324. In this structure, a leaf spring that uniformly forces upward friction plates, which are on the case side of the multiple-plate brake, is provided at the lowest position of the case-side friction plates to prevent the friction plates from falling due to gravity. In a structure disclosed in Japanese Patent Application Laid-open No. 59-137621, a spring member has a large comb shape and is formed by a complicated bending process. Other structures that prevent the wobbling and vibration of a friction plate are disclosed in Japanese Utility Model Application Laid-open Nos. 56-101223 and 2-36631.

Since the conventional structures for preventing the vibration of friction plates absorb the wobbling of stationary friction plates in the direction of the diameter, wobbling and vibration in a rotational direction can not effectively be prevented. Further, as an employed spring member is large and has a complicated structure, the cost of a spring member is high and to hold it a special structure must be additionally provided on the spline side. The attachment of a large spring member is not easy, and before it is removed or mounted, many intervening components must be removed first.

In addition, in a structure that employs a spring member to forcibly press friction plates either in an upward or a downward direction, the friction plates are forced to an eccentric position, and intervals between the edge faces of the friction plates and the spline faces vary. When the friction plates are engaged, due to the variable intervals, an excessive pressure acts on a limited few edge faces and as a result these edge faces are deformed. Thus, the wobbling of the friction plates is increased, and the movement of the friction plates is more eccentric. The eccentricity of the friction plates reduces the service life of the friction plates in the sense that during braking the pressure state varies depending on each of the spline faces around the circumference, and results in uneconomic design because it must require unreasonably high safety rate.

SUMMARY OF THE INVENTION

It is one object of the present invention to provide a highly effective clutching device, for preventing the vibration of friction plates, for which low cost components are required, and that has a mechanism in which required components are easily removed and installed.

A clutching device according to the present invention comprises:

two sets of friction plates, which engage respectively paired splines that are located opposite to each other in a direction of a diameter and which are alternately positioned and share a ring-shaped overlapping area, two sets of the friction plates being pressed together and engaged in a rotational direction; and a flexible member, which is provided at least at one position around a circumference of the friction plates whose rotation is halted in the disengaged state, between edge faces on a side at which no load is applied during engagement and a spline face that is opposite to the edge faces, and which forces the friction plates almost in a circumferential direction.

In the clutching device, the edge faces of the friction plates are forced in one circumferential direction by the flexible member, i.e., in a direction in which the edge face to which a load is applied during the engagement of a clutch or a brake, is pressed against the opposite spline face. The positional relationship, in the circumferential direction, of the edge face, to which a load is applied during engagement, and the spline face, which is opposite to the edge face, is identical in the engaged state and in the disengaged state, and the space in which vibration occurs during the disengagement is eliminated. Thus, wobbling and vibration does not occur. The movement of the friction plates does not become eccentric when the friction plates are forced in a circumferential direction, unlike when they are forced in the direction of the diameter (upward and downward). Even in the disengaged state, a load is applied to the entire edge face of the friction plates to maintain almost the same contact condition with the spline faces as exists in the engaged state. Then, when engagement is performed suddenly, impacting of the edge faces against the spline faces does not occur. Therefore, the pressure conditions at the edge faces are uniform, deformation is not caused by variable pressure conditions, and the vibration f the friction plates is not extended, even when engagement and disengagement are repeated frequently.

When a clutching device is a multiple plate clutch, the rotational positions of the friction plates different in consonance with the phase positions where the engagement is released and halted. When a clutching device is a multiple plate brake, one of the friction plates has constant fixed rotation relative to the case. In the multiple plate brake, the positions of the flexible members that are inserted between the friction plates and the spline faces are constant.

Thus, it is another object of the present invention to provide a clutching device which comprises: a plurality of first friction plates, which engage splines provided in a case of an automatic transmission; a plurality of second friction plates, which are alternately positioned with the first friction plates and that engage a spline that is formed in a member that is rotatable relative to the case; a hydraulic piston mechanism, for shifting in a direction of a rotational axis, for pressing together the first and the second friction plates, and for exerting pressure on a ring-shaped area where the first and the second friction plates overlap; and a flexible member, for forcing the first friction plates almost in a circumferential direction, that is inserted between edge faces of the first friction plates, which are positioned at an angle such that a rotational direction of the rotatable member is diagonally upward toward the center and which are on a side at which no load is applied during engagement, and a spline face, which is opposite to the edge faces.

In this clutching device (multiple plate brake), the flexible members are provided at a position where the greatest effect for the prevention of wobbling can be acquired in consonance with the characteristic of the vibration of the first friction plates that actually occurs. The vibration of the first friction plates caused reciprocating rotational movements of the upper half of the rotatable member at the point where the rotation ascends, while employing as a fulcrum one meshing portion of the lower half of the rotatable member where the rotation descends.

Therefore, the flexible member is located in one meshing portion in an area, the farthest from the fulcrum, where a vibration direction and a direction in which the flexible member is bent are identical, i.e., an area where the upper half of the rotatable member ascends during its rotation, that is, where rotation of the second friction plates is diagonally upward toward the center.

In the above clutching device, the flexible member could be formed by bending a thin metal plate into a bellows shape and inserted in the direction of the rotation axis of the rotatable member, so that the flexible member uniformly forces the first friction plates while faces of an M-shaped cross section of the flexible member abut upon the edge faces and the spline face, respectively.

In this construction, the spring member (flexible member), which has a bellow-shaped cross section and which bends in alternate direction, forces a plurality of the first friction plates in a circumferential direction at the same time as it presses the load-applied edge faces against the opposite spline faces. Thus, no vibration of the first friction plates occurs. Since the spline face on which the spring member is located is common to the one set of friction plates, the spring member need only to be linear and as wide as or narrower than the height of the spline. The spring member can be attached simply by inserting it into a gap between the edge face and the spline and parallel to the spline. Since the clearance in a circumferential direction between the edge face and the spline is smaller than the vibration width in the direction of the diameter, the maximum allowable deformation value for the spring member can be very small.

It is still another object of the present invention to provide a clutching device which comprises: a plurality of first friction plates, which engage a spline provided in a case of an automatic transmission; a plurality of second friction plates, which are alternately positioned with the first friction plates and which engage a spline that is formed in a member that is rotatable relative to the case; a hydraulic piston mechanism, for shifting in a direction of a rotational axis, for pressing together the first and the second friction plates, and for exerting pressure on a ring-shaped area where the first and the second friction plates overlap; and a weight board, which is attached at a position other than where the first friction plates overlap the second friction plates to increase the weight of the first friction plates.

In this clutching device, the inertial weight of the first friction plate is increased so that it will not be easily pulled by a second friction plate that is rotating. The weight board is attached only within a range having a constant angle to increase the moment of inertia per weight. A weight board that is equal in thickness to or thinner than the second friction plate does not interfere with the clutch locking even if it is located at an external position in the direction of the diameter of the second friction plate.

Even when there is vibration of the friction plate, not all of the first friction plates actually vibrate. If a plurality of the first friction plates are vibrating, their vibrating widths and cycles are different each other.

Further object of the present invention is to provide a clutching device which comprises: aplurality of first friction plates, which engage a spline that is provided in a case of an automatic transmission; a plurality of second friction plates that are alternately positioned with the first friction plates and which engage a spline that is formed in a member that is rotatable relative to the case; a hydraulic piston mechanism for shifting in a direction of a rotational axis, for pressing together the first and the second friction plates, and for exerting pressure on a ring-shaped area where the first and the second friction plates overlap; a pin hole that is formed at a position at such an angle that a rotational direction of the rotatable member is diagonally upward to the center and that is not within the area where the first friction plates overlap the second friction plates; and a pin shaft, which passes the first friction plates through the pin hole to inhibit relative movement of the first friction plates.

In this clutching device, the pin shaft is employed to mutually couple all the first friction plates, so that relative vibration is prevented at least in the direction that corresponds to the width of the vibration. A single first friction plate on which stimulus has acted is only allowed to vibrate while interlocking with all the other first friction plates. The inertial mass of a single first friction plate is substantially increased by the pin shaft. The pin shaft may be engaged with or held by a member (the bottom wall of the spline, or a retaining plate) that is positioned outside of the friction plate. As the mass obtained by coupling circumferential movement via the pin shaft is large, hardly any vibration occurs.

BRIEF DESCRIPTION OF THE DRAWINGS

Other objects and advantages of the present invention will be understood from the following description of preferred embodiments, which are shown in accompanying drawings in which:

FIGS. 2A though 5B are explanatory diagrams for example flexible members; wherein

DETAILED DESCRIPTION OF THE PREFERRED EMBODIMENTS

The first embodiment will now be described while referring to FIGS. 1 through 7.

Figure 1:
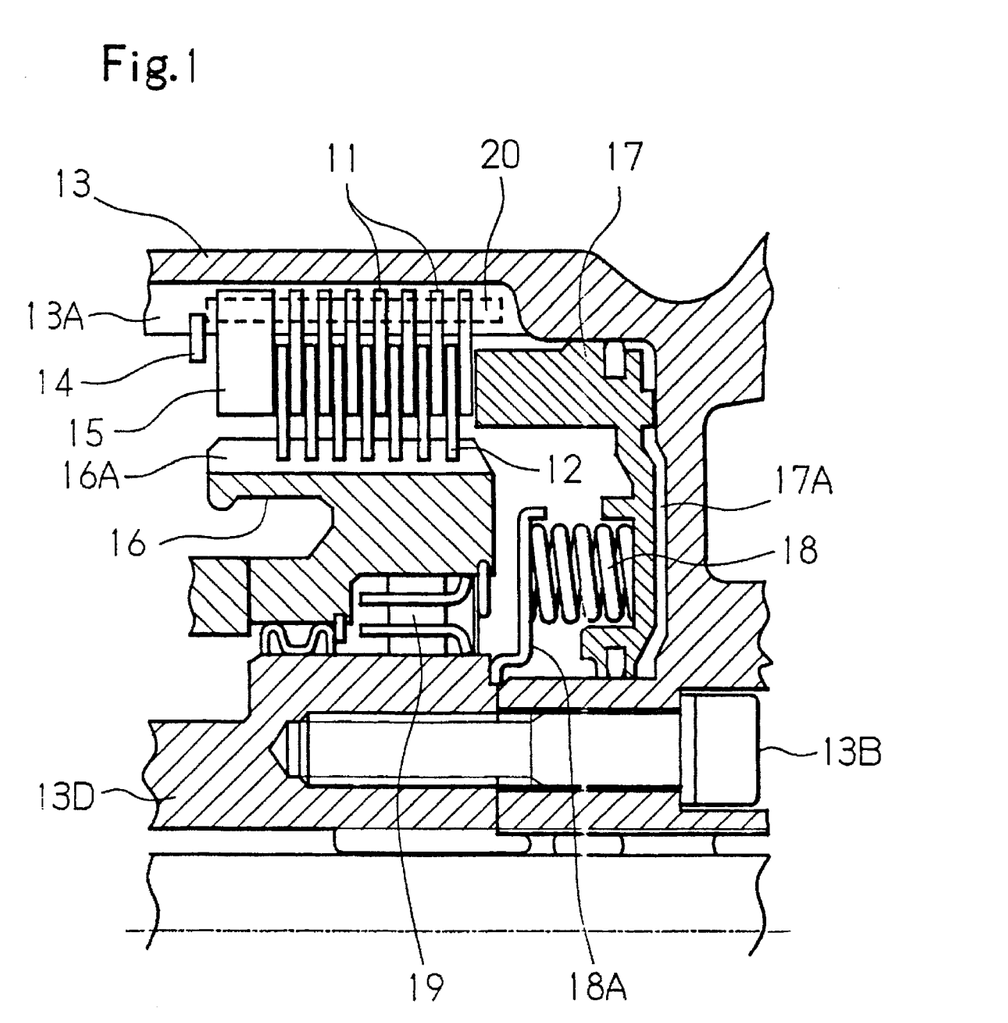
FIG. 1 is a partial cross sectional view of an automatic transmission showing a first embodiment of the present invention.

In FIG. 1, one of a plurality of brakes that constitute an automatic transmission is illustrated. Stopping side friction plates that are located outside are driven plates 11, while rotating side friction plates that are located inside are drive plates 12. The rotation of a rotary body 16 that engages the drive plates 12 is prevented by the friction between the driven plates 11 and the drive plates 12. A spline 13A is formed on the internal face of a gear box 13 of the automatic transmission, and engages a spline edge that is formed along the outer surfaces of the driven plates 11. The internal rotary body 16 is so supported by a bearing 19 and a further internally located member 13D that it can freely rotate. The member 13D is fixed to the gear box 13 by a bolt 13B. The spline edges that are formed along the internal surfaces of the drive plates 12 engage a spline 16A of the rotary body 16. The driven plates 11 can be shifted along the spline 13A in the axial direction of the automatic transmission, while the drive plates 12 can be shifted along the spline 16A in the axial direction of the transmission.

The drive plates 12 and the driven plates 11, which are alternately overlapped, are sandwiched from the sides between a retaining plate 15 and a hydraulic piston 17. The hydraulic piston 17 is driven to the left in the diagram when pressure oil is supplied to a hydraulic chamber 17A, which is formed in a gap between the hydraulic piston 17 and the gear box 13 that is located on the right side. A spring 18 abuts upon the hydraulic piston 17 and is supported by a spring seat 18A that is fitted into the member 13D and forces the hydraulic piston 17 toward the right in the diagram. The retaining plate 15 has a spline edge formed along its external surface to engage the spline 13A. Although the retaining plate 15 can be shifted along the spline 13A in the axial direction of the automatic transmission, a snap ring 14 that is fixed to the spline 13A restricts its shifting to the left in the diagram. When pressure oil is supplied to the hydraulic chamber 17A, the hydraulic piston 17 compresses the spring 18 and moves to the left. The hydraulic piston 17, in conjunction with the retaining plate 15, which is in contact with the snap ring 14, compresses the overlapping portions of the driven plates 11 and the drive plates 12. This compression force generates a frictional force between the driven plates 11 and the drive plates 12, so that a braking torque is transmitted via the spline 13A, the driven plates 11, the drive plates 12, and the spline 16A to halt the rotation of the rotary body 16.

In the automatic transmission in this embodiment, a flexible member 20 is inserted into one portion around the circumference of the gear box 13, i.e., between the spline 13A and the driven plates 11. Such an angle position is selected that the rotational direction on the drive side is diagonally upward toward the center, and a flexible member is located between the spline face and the edge face to which no load is applied when the friction plate on the brake side is engaged.

The flexible member 20 is so positioned in the axial direction that its movement is restricted by the rearmost wall of the spline 13A and the snap ring 14. The flexible member 20 equally forces the spline edges of all the driven plates 11 in the circumferential direction. The flexible member 20 is inserted into the side to which no load is applied when the brake engages. Even when the released condition (disengaged) the spline edges and the spline face, which contact each other at the engagement of the brake, are kept in contact by the flexible member 20. Neither a load that occurs when the brake engages, nor a load that is placed on the driven plates 11, which are pulled by the rotating drive plates during the released condition, acts on the flexible member 20. Therefore, the amount of distortion that will be generated is very small.

Since the load that is applied to the flexible member 20 is always small and an allowable distortion value is also small, it is not necessary for the flexible member 20 to be formed in a complicated comb shape, as in a conventional device where a backing face is provided that corresponds to each of the driven plates 11. Therefor the flexible member 20 has a simple rectangular or a bar shape as shown in FIG. 2A through FIG. 5B. Further, since the condition where a constant light load is applied is always maintained and the shifting of positions does not occur, a specific structure for fixing the flexible member 20 to the spline 13A is not required.

Under the requirement of such free conditions, various materials and shapes can be employed. FIGS. 2A through 5B are explanatory diagrams for some example flexible members.

Figure 2A:
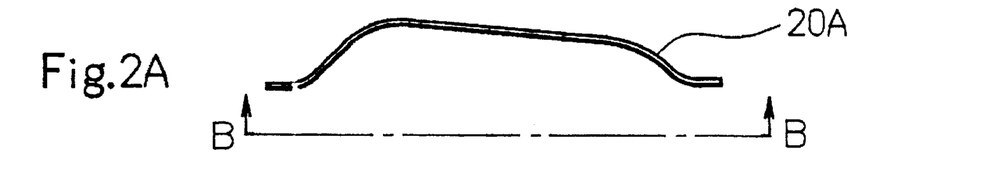
Figure 2B:
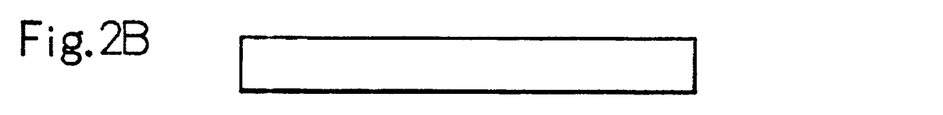
FIG. 2B is a view along the line B—B of FIG. 2A.

A flexible member 20A shown in FIGS. 2A and 2B is made by bending a thin spring steel plate so that it has an arc shape. By bending the spring steel plate only a little at the right side in the diagram, insertion to the right and extraction to the left is facilitated.

Figure 3A:
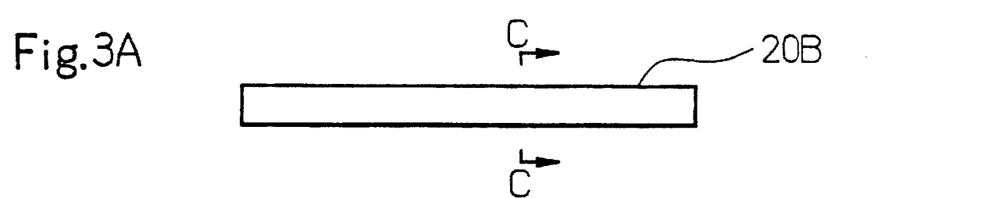
Figure 3B:
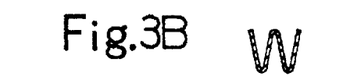
FIG. 3B is a cross sectional view taken along the line C—C of FIG. 3A.

A flexible member 20B shown in FIGS. 3A and 3B is made by bending a thin spring steel plate so that its cross section has a W shape.

Figure 4A:
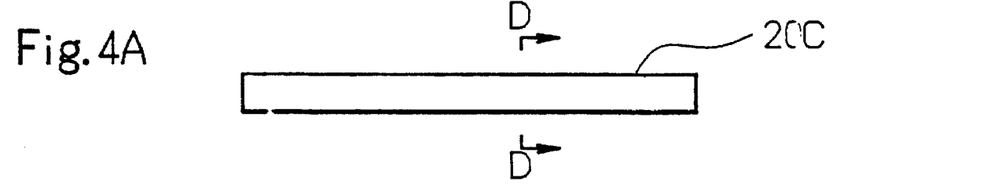
Figure 4B:
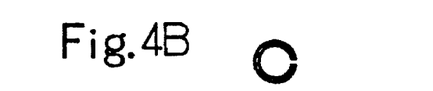
FIG. 4B is a cross sectional view taken along the line D—D of FIG. 4A.

A flexible member 20C shown in FIGS. 4A and 4B is formed in the same manner and has a C shaped cross section.

Figure 5A:
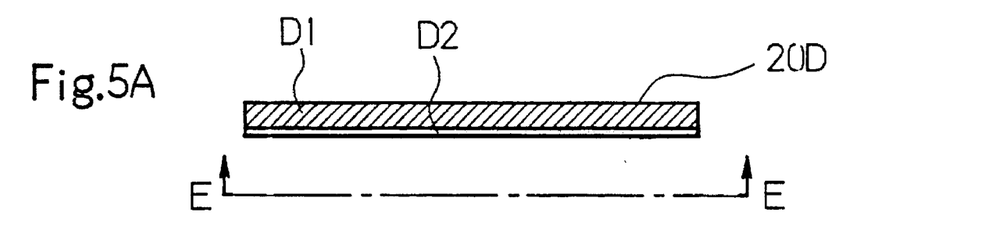
Figure 5B:
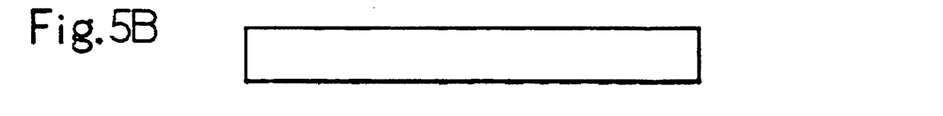
FIG. 5B is a view along the line E—E of FIG. 5A.

A flexible member 20D shown in FIGS. 5A and 5B is made by bonding a resin rubber layer D1 to a thin metal plate D2.

Figure 6A:
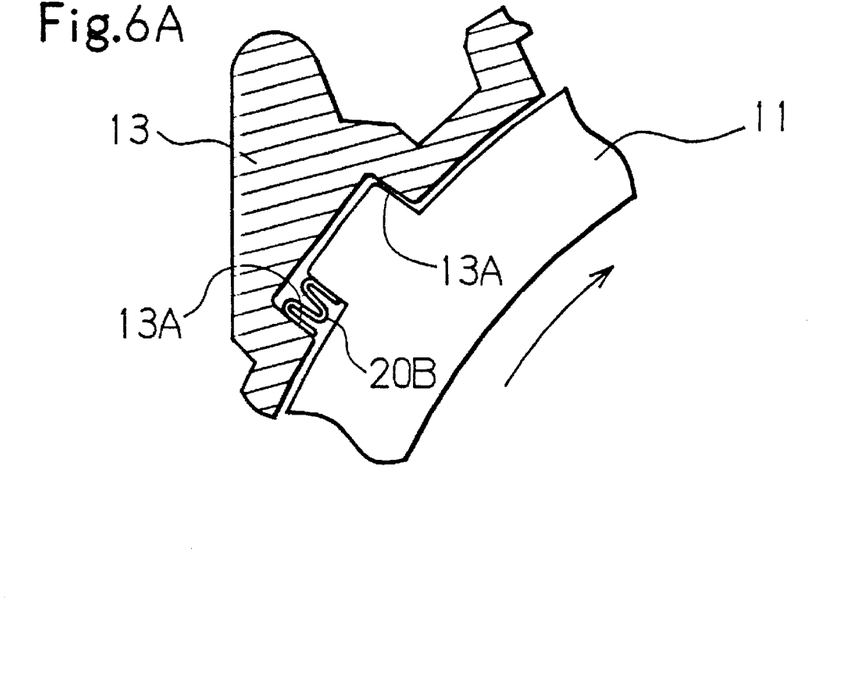
FIG. 6A is a diagram of a cross section vertical to a shaft of the automatic transmission.

In FIG. 6A, the rotation direction of the drive plates 12 shown in FIG. 1 is indicated by the arrow. The spline edges of the driven plates 11 are held by the spline 13A that is formed in the gear box 13. In this case, the flexible member 20B shown in FIG. 3A and 3B is employed. Although there are two gaps in the circumferential direction between the spline 13A and the spline edge of the driven plate 11, the flexible member 20B is mounted in the gap at trailing side of the rotational direction of the drive plate 12. When the brake engages, the driven plate 11 is biased by the internal drive plate 12 in the direction indicated by the arrow. At this time, the gap of loading side in which the flexible member 20B is not located is reduced. When the brake is released (disengaged), the internal drive plate 12 pulls the driven plate 11 in the direction indicated by the arrow. At this time, the gap in which the flexible member 20B is not located is also reduced. The load that is placed on the flexible member 20B is very small, smaller than the weight of the driven plate 11. There is no fluctuation, either.

Figure 6B:
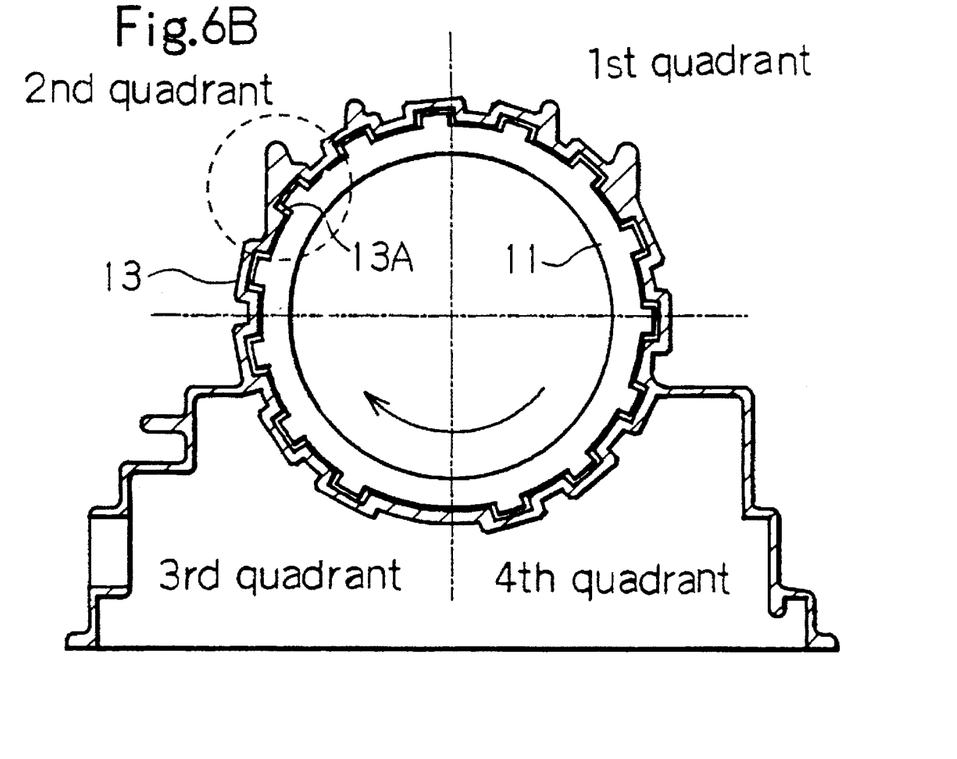
FIG. 6B is an enlarged fragmentary view of the dotted area of FIG. 6A.

In FIG. 6B, the rotational direction of the drive plate 12 is indicated by the arrow. The portion enclosed by the dotted line is the one that is shown in FIG. 6A. The flexible member 20B is located at one position around the circumference of the gear box 13, i.e., in one of the gaps in the circumferential direction between the spline 13A and the driven plate 11 in the second quadrant. The second quadrant is an area where the rotation of the drive plate 12 ascends toward the center. For restricting the vibration of the driven plate 11, the greatest effect can be obtained when the flexible member is located in the second quadrant rather than in the other quadrants. The reason will be explained while referring to FIG. 7.

Figure 7:
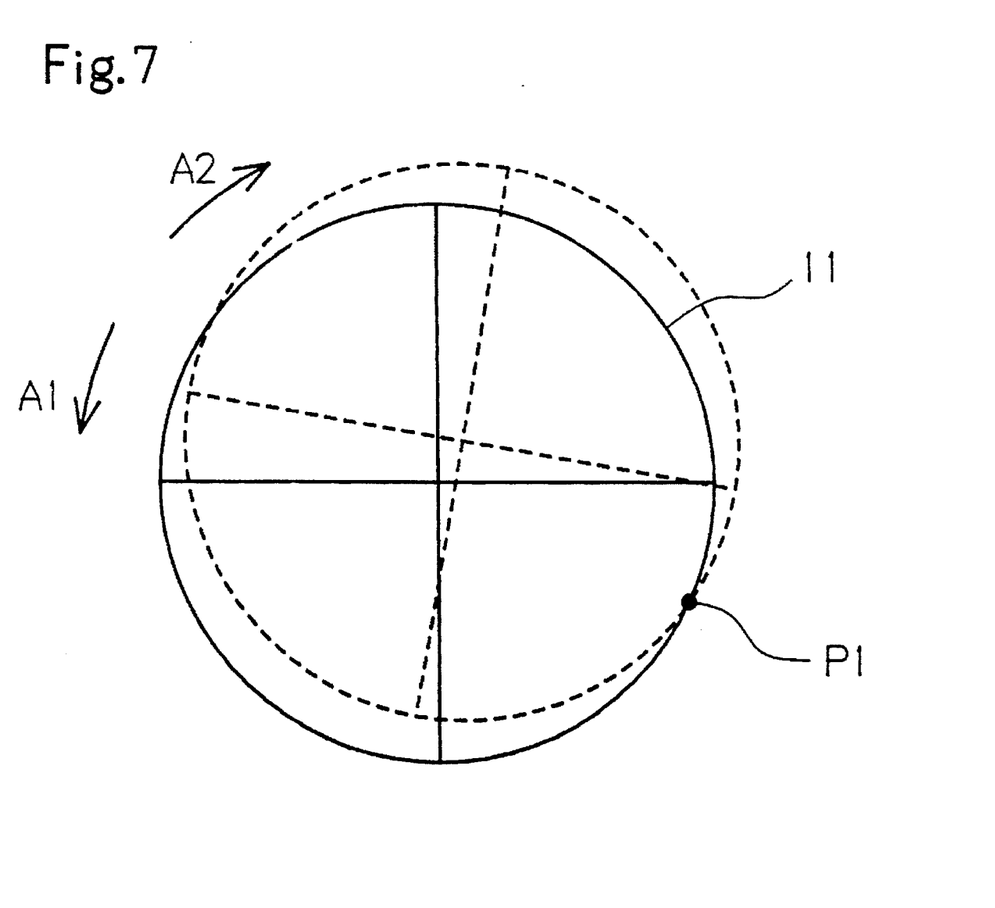
FIG. 7 is a specific diagram illustrating the vibration mode.

The driven plate 11 is specifically illustrated in FIG. 7. The driven plate 11 vibrates as indicated by arrows A1 and A2 by employing, as a fulcrum, one engagement portion of the spline 13A and the driven plate 11 in the fourth quadrant shown in FIG. 6B. Therefore, in the second quadrant, the direction of the amplitude of the vibration corresponds to the circumferential direction of the driven plate 11 in which the flexible member 20 functions fully as a spring. The flexible member 20, when located in the second quadrant, efficiently absorbs the amplitude of the vibration.

According to the thus structured automatic transmission of the first embodiment, the flexible member 20 that forces the driven plates 11 in the circumferential direction is employed so that the driven plates are pressed against the spline 13A in the same manner when the brake is disengaged as they are when the brake engaged. Thus, there is no chance for the driven plates 11 to drop of their own weight, and accordingly, vibration does not occur. Since the flexible member 20 is located on the side to which no load is applied and forces the driven plates in the circumferential direction, the load that is applied to the flexible member 20 and an allowable distortion value are small. The flexible member 20 can be simply structured without requiring a special structure for installation. Further, as the flexible member 20 is provided in the second quadrant of the gear box 13, the direction in which the flexible member 20 is distorted corresponds to the direction in which a load due to vibration is applied. The maximum effect for restricting vibration can therefore be obtained and the shifting in the position of the flexible member 20, which is caused by the force in the diameter direction, does not occur. In the first embodiment, for positioning, all the driven plates 11 are pressed uniformly against the spline 13A by a single flexible member 20. However, flexible members may be provided for the individual driven plates 11 or for every 2 or 3 sets of driven plates 11. The material for the flexible member 20B shown in FIG. 6A may be a thin stainless steel as well as the spring steel plate described above, and the cross section, besides being M-shaped, of the flexible member 20B have another bellows shape, such as a V-shaped bellows, an N-shaped bellows, or a W-shaped bellows.

When the flexible member 20A shown in FIGS. 2A and 2B is employed, it is desirable that the flexible member 20A is set in such a way that its arcuate portion abut upon the edge faces of the driven plates and its ends abut upon the face of said spline 13A.

Figure 8:
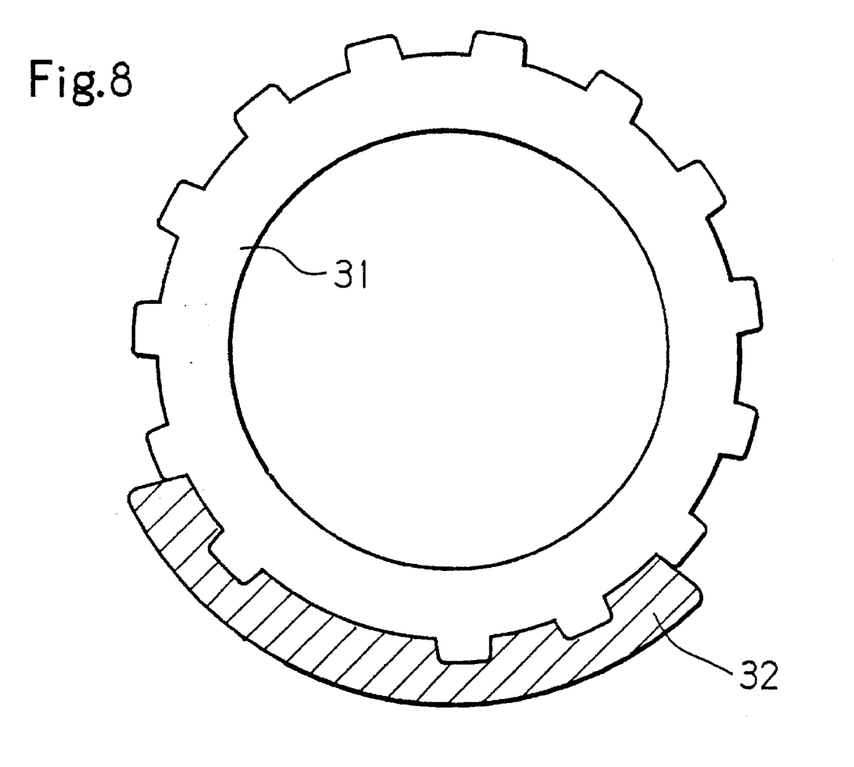
FIG. 8 is a diagram showing a vibration preventing mechanism according to a second embodiment of the present invention.

A vibration preventing structure according to a second embodiment will now be described while referring to FIG. 8. In this embodiment, a weight board is attached to friction plates that are on the stopping side in order to increase the inertial moment. In FIG. 8, a weight board 32 is attached to the lower portion of driven plates 31, which are located in the same manner as are the driven plates 11 for the automatic transmission in FIG. 1 and which function the same as the driven plates 11. The weight board 32 is located so that it occupies part of the lower portion of the driven plates 31. Since the area where drive plates (not shown) face the driven plates 31 is the same either with or without the weight board 32 being attached, a pulling force that is due to the drive plates, and which serves as a stimulus force for vibration, is not changed. On the other hand, as the weight of each of the driven plates 31 is increased, the driven plates 31 can hardly be raised, even when they are pulled, and vibration seldom occurs. In addition, as the weight board 32 is located so that it occupies part of the lower portion of the driven plates 31, the inertial moment around point P1 in FIG. 7 is increased and the rotation in the directions indicated by A1 and A2 occurs hardly at all. In this manner, the vibration of the driven plates can be effectively prevented in this embodiment as in the first embodiment.

A vibration preventing structure in a third embodiment will be explained while referring to FIG. 9. In this embodiment, a plurality of friction plates on the stopping side are coupled together by a pin.

Figure 9:
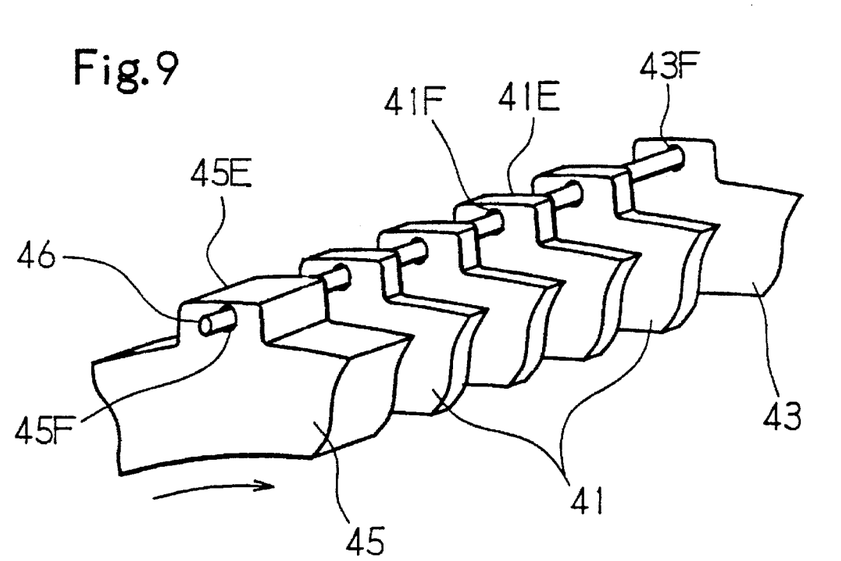
FIG. 9 is an explanatory diagram showing a vibration preventing mechanism according to a third embodiment of the present invention.

In FIG. 9, a direction in which drive plates (not shown) are rotated is indicated by an arrow. A through hole 41F is formed in a portion 41E where a spline (not shown) engages driven plates 41 that are located in the same manner as are the driven plates 11 in FIG. 1 and that function in the same way. The driven plates 41 are coupled to each other by passing a pin 46 through the through hole 41F. One end of the pin 46 is securely fitted into a blind hole 43F that is formed in a gear box wall 43, which is located at the rearmost position of the spline (not shown). The other end of the pin 46 is fitted into a through hole 45F that is formed in a portion 45E of a retaining plate 45, which is located in the same manner as is the retaining plate 15 in FIG. 1 and which functions in the same way.

Movement in the circumferential direction of all the driven plates 41 and the retaining plate 45 is inhibited by the spline (not shown) that is formed in the gear box 43, and is further restricted by the pin 46. The shifting in the axial direction of the automatic transmission is free. For the same reason as is described while referring to FIG. 7, such a vibration preventing structure is provided in one portion around the circumference of the driven plate 41, i.e., in the second quadrant in FIG. 6B. Thus, even when the driven plates 41 are pulled by the drive plates (not shown), the driven plates 41 can not actually vibrate because they are bound together by the pin 46. By increasing positioning accuracy in the formations of the blind hole 43F in the wall 43 and the through hole 41F for the drive plates 41, the driven plates 41 can be hung while their centers exactly correspond to the center axis of the automatic transmission. And thus, wobbling in the diameter direction, and the eccentric movement of the driven plates due to the wobbling, can be eliminated.

Therefore, as in the first embodiment, the vibration of the driven plates can be effectively restricted by employing the least required number of items and by adding a minimum of processes.

According to the clutching device of the present invention, compared with the conventional vibration preventing structure, a greater effect for vibration prevention can be obtained by providing smaller components. The wobbling of friction plates in the direction of the circumference and in the direction of the diameter can be effectively absorbed. Since the structure is uncomplicated and a small spring member (flexible member) can be used, the costs for the spring members are low. And an assembly structure that holds the spring members that should be located on the spline side is simple, and such an assembly structure can be removed as needed. The mounting of the small spring members is easy, and it requires the minimum number of components that must be removed before the replacement of the spring members is possible.

Since the friction plates are forced only in the circumferential direction, the movement of the friction plates becomes less eccentric than that of those in the conventional structure where the friction plates are pressed in the diameter direction. The intervals between the edges of the friction plates and the respective spline faces can be equal, so that, when the friction plates are engaged, pressure conditions at the individual edge surfaces are uniform, the edge faces are not deformed, and an increase in the wobbling of the friction plates does not occur. The service life of the friction plates is extended, and a safety rate that should be provided for friction plates in the design is reduced so that designing is less demanding. For example, the height and the number of teeth of the spline can be decreased.

When the structure where the flexible member is located at the position where the rotation upward to the center is performed is especially applied to a multiple-plate brake, where the friction plates that are driven (friction plates on the stopping side, the first friction plates, or the driven plates) are bound together by a case of the automatic transmission and do not rotate, a comparatively greater vibration prevention effect can be obtained than when the flexible member is located at any other position.

When the flexible member is made of a thin metal plate with an M-shaped cross section, it has high durability and a low manufacturing cost, and its function as a spring can be performed constantly even if the temperature in the automatic transmission is changed.

The structure where the weight board is attached to part of the friction plates can effectively prevent vibration.

The structure where the friction plates are linked to each other by a pin can provide the vibration prevention effect and absorb the wobbling in the up-and-down direction while the friction plates are positioned in the center of the automatic transmission.

What is claimed is:

1. A clutching device comprising:

two sets of friction plates, which engage respectively paired splines that are located opposite to each other in a direction of a diameter and which are alternatively positioned and share a ring-shaped overlapping area, said two sets of friction plates being pressed together and engaged in a rotational direction in an engagement state; and a flexible member, separate from said friction plates and provided at least at one position around a circumference of said friction plates, whose rotation is halted in a disengaged state, between edge faces of at least one of said two sets of friction plates, on a side at which no load is applied during said engagement state, and a spline face that is opposite to said edge faces, wherein said flexible member applies a force to said at least one of said two sets of friction plates in a circumferential direction.

2. A clutching device comprising:

a plurality of first friction plates that engage a spline provided in a case of an automatic transmission;

a plurality of second friction plates, which are alternately positioned with said first friction plates, that engage a spline that is formed in a rotatable member that is rotatable about a rotatable axis relative to said case;

a hydraulic piston mechanism for pressing together said first and second friction plates in a direction parallel to the rotatable axis of said rotatable member, thereby exerting pressure on a ring-shaped area where said first and second friction plates overlap; and a flexible member, separate from said first frictional plates that is inserted between edge faces of said first friction plates and a spline face, of said spline provided in said case, which is opposite to said edge faces;

wherein said flexible member exerts a force on said first friction plates in a circumferential direction on a side at which no load is applied during an engagement state; and wherein said flexible member exerts a force on said first friction plates in a circumferential direction on a side at which no load is applied during an engagement state; and wherein said flexible member is located in a second quadrant of said automatic transmission.

3. A clutching device according to claim 2, wherein said flexible member is formed by bending a thin metal plate into a bellows shape and is inserted in said direction of said rotation axis of said rotatable member, so that said flexible member uniformly forces said first friction plates while faces of said flexible member abut upon said edge faces and said spline face, respectively.

4. A clutching device according to claim 2, wherein said flexible member is formed by bending a thin metal plate so as to have an arcuate portion, and is inserted in the direction of said rotation axis of said rotatable member, so that said flexible member uniformly forces said first friction plates while said arcuate portion of said flexible member abut upon said edge faces and ends of said flexible member abut upon said spline face, respectively.

5. A clutching device according to claim 2, wherein said flexible member is formed by bending a thin metal plate so as to have a C shaped cross section and is inserted in the direction of said rotation axis of said rotatable member, so that said flexible member uniformly forces said first friction plates while the outer circumference of said flexible member abut upon said edge faces and said spline face.

6. A clutching device according to claim 2, wherein said flexible member has a resin rubber layer on a thin metal plate and is inserted in said direction of said rotation axis of said rotatable member, so that said flexible member uniformly forces said first friction plates while faces of said flexible member abut upon said edge faces and said spline face, respectively.

7. A clutching device comprising:

a plurality of first friction plates, which engage a spline provided in a case of an automatic transmission;

a plurality of second friction plates, which are alternately positioned with said first friction plates and which engage a spline that is formed in a member that is rotatable relative to said case;

a hydraulic piston mechanism, for shifting in a direction of a rotational axis, for pressing together said first and said second friction plates, and for exerting pressure on a ring-shaped area where said first and said second friction plates overlap; and a weight board, which is attached at a position other than where said first friction plates overlap said second friction plates to increase the weight of said first friction plates.

8. A clutching device comprising:

a plurality of first friction plates that engage a spline provided in a case of an automatic transmission;

a plurality of second friction plates, which are alternately positioned with said first friction plates, that engage a spline that is formed in a rotatable member that is rotatable about a rotatable axis relative to said case;

a hydraulic piston mechanism for pressing together said first and second friction plates in a direction parallel to the rotatable axis of said rotatable member, thereby exerting pressure on a ring-shaped area where said first and second friction plates overlap; and a pin hole that is formed in each of said first friction plates at a position that is not within said ring-shaped area where said first friction plates overlap said second friction plates; and a pin shaft that passes through said first friction plates through said pin hole to inhibit relative movement of said first friction plates;

wherein said pin hole and said pin shaft are located in a second quadrant of said automatic transmission and said pin hole is the same diameter in each of said first friction plates.

* * * * *